United States Patent [19]

Vander Arend et al.

[11] 4,048,437
[45] Sept. 13, 1977

[54] SUPERCONDUCTING MAGNET COOLING SYSTEM

[75] Inventors: Peter C. Vander Arend, Center Valley, Pa.; William B. Fowler, St. Charles, Ill.

[73] Assignee: The United States Energy Research and Development Administration, Washington, D.C.

[21] Appl. No.: 584,423

[22] Filed: June 6, 1975

Related U.S. Application Data

[63] Continuation of Ser. No. 469,919, May 16, 1974, abandoned.

[51] Int. Cl.² .......................................... H01B 12/00
[52] U.S. Cl. .................................. 174/15 S; 335/216
[58] Field of Search .................. 174/15 S, 15 C; 335/216

[56] References Cited

U.S. PATENT DOCUMENTS

| | | | |
|---|---|---|---|
| 3,162,716 | 12/1964 | Silver | 174/15 S |
| 3,292,016 | 12/1966 | Kafka | 174/15 S |
| 3,463,869 | 8/1969 | Cooley et al. | 174/15 S |
| 3,686,422 | 8/1972 | Doose | 174/15 S |
| 3,697,665 | 10/1972 | Doose et al. | 174/15 S |
| 3,800,062 | 3/1974 | Kataoka et al. | 174/15 S |
| 3,835,239 | 9/1974 | Schmidt | 174/15 S |

*Primary Examiner*—Arthur T. Grimley
*Attorney, Agent, or Firm*—Dean E. Carlson; Frank H. Jackson; Paul A. Gottlieb

[57] ABSTRACT

A device is provided for cooling a conductor to the superconducting state. The conductor is positioned within an inner conduit through which is flowing a supercooled liquid coolant in physical contact with the conductor. The inner conduit is positioned within an outer conduit so that an annular open space is formed therebetween. Through the annular space is flowing coolant in the boiling liquid state. Heat generated by the conductor is transferred by convection within the supercooled liquid coolant to the inner wall of the inner conduit and then is removed by the boiling liquid coolant, making the heat removal from the conductor relatively independent of conductor length.

10 Claims, 3 Drawing Figures

SUPERCONDUCTING MAGNET COOLING SYSTEM

CONTRACTURAL ORIGIN OF THE INVENTION

The invention described herein was made in the course of, or under, a contract with the UNITED STATES ATOMIC ENERGY COMMISSION.

This is a continuation, division of application Serial No. 469,919, filed May 14, 1974.

BACKGROUND OF THE INVENTION

The cooling of conductor over extended distances has been a costly and cumbersome operation due to the difficulty in transporting coolant maintained in a central refrigerator along the length of the conductor. For example, the cryogenic design of a superconducting accelerator requires the transportation of coolant from the central refrigerator or liquefier to the magnets located along the length of the accelerator. Such lengths may extend over relatively great distances, such as 100 meters or more. Cooling and establishing steady-state conditions in a series of magnets as used for beam lines or accelerators requires removal of large amounts of heat. In the temperature range of 4° to 6° K such as might be required for a superconducting accelerator, refrigeration becomes particularly expensive if cooling is unduly dependennt upon conductor length.

It is therefore an object of this invention to provide a means for cooling a conductor to the superconducting state.

Another object of this invention is to provide a means for cooling a system of magnets for use in a superconducting accelerator.

Another object of this invention is to provide a means for cooling a conductor to the superconducting range between 4° and 10° K.

SUMMARY OF THE INVENTION

A cryogenic liquid coolant contained in a liquid reservoir of a refrigerator is compressed by a pump to a supercooled liquid coolant and made to flow through an inner conduit. Within the inner conduit is the conductor to be cooled. The liquid coolant flows from one end of the inner conductor to the other in contact with the conductor. At the end of this length, the liquid coolant exits the inner conductor and is made to flow through a valve to become a boiling liquid, still at cryogenic temperature. The boiling liquid is returned to the reservoir via an annular space around the inner conduit, formed by an outer conduit within which the inner conduit is positioned. Heat developed by the superconducting conductor is transferred via convection from the conductor to the inner wall of the inner conduit, and then to the boiling liquid coolant by which it is transported away from the conductor. The boiling liquid coolant performs the function of removing heat from the conductor and from shielding the conductor from the warm outside environment. Because the heat from the conductor is removed via convection, the heat transfer process from the conductor is relatively independent of conductor length.

DETAILED DESCRIPTION OF THE INVENTION

Figure 1:
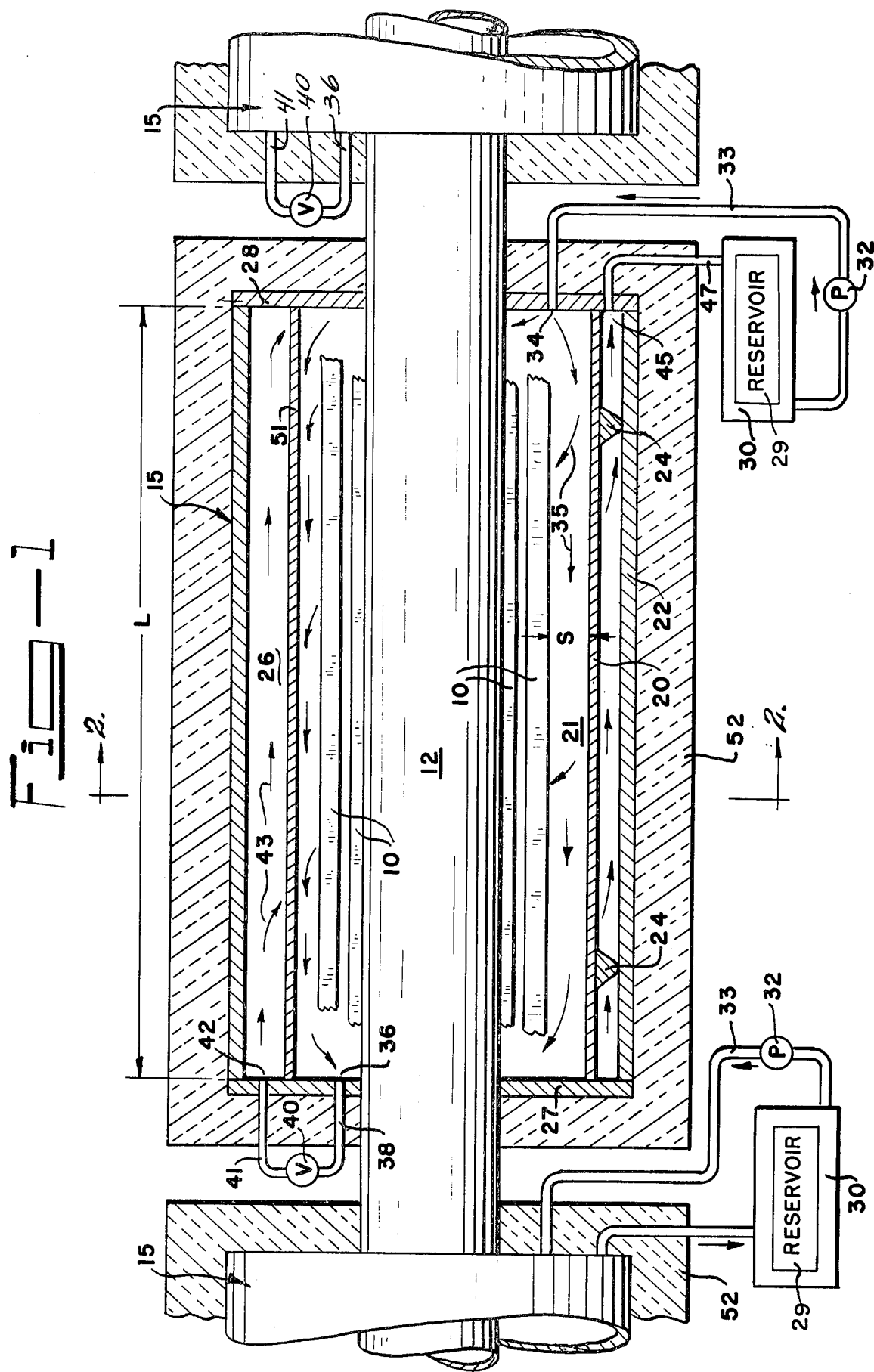
FIG. 1 is a schematic and sectional view of a means for cooling a conductor.
Figure 2:
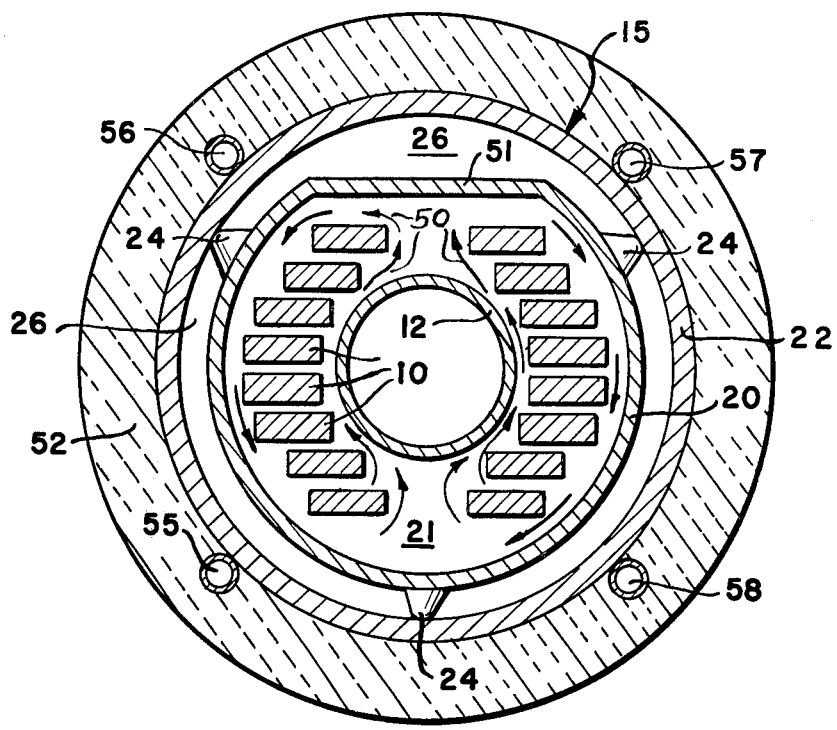
FIG. 2 is a section taken along line 2—2 of FIG. 1.

Referring to FIG. 1 and FIG. 2, there is shown a means for cooling a conductor to a superconducting state. For purposes of example, in the embodiment illustrated the conductor is shown as a series of longitudinal conductors 10 surrounding a beam tube 12 of an accelerator. The conductors are coupled to a voltage source (not shown) and form a magnet for controlling accelerated particles in beam tube 12. The conductors 10 are to be cooled to the superconducting state to provide an improved accelerator, It is, of course, understood that the practice of this invention is not limited to the embodiment illustrated in FIG. 1 and FIG. 2 but is applicable to any material required to be maintained at superconducting temperatures.

The temperature at which the conductor is to be maintained and the rate of heat removal are determined by the temperature at which it becomes superconducting and the amount of heat which it will generate with current flowing through it. For example, a niobium-titanium conductor requires cooling to about 10° K or less to be superconducting, while a niobiumtin conductor requires cooling to about 16° K or less. The heat generated with niobium-tin conductors 10 developing a magnetic field of 50 kilogauss is on the order to 1 watt per meter, while the heat load associated with the warm environment in which the magnet is positioned is approximately 2 to 4 watts per meter. For an accelerator operating in such conditions, the conductors 10 should be maintained at temperatures from 3.6° to 4.8° K. The temperature at which conductors 10 are to be maintained determines the suitable coolant. Helium is the preferred coolant for the lowest temperatures, such as for the ranges mentioned above. For temperature maintenance above about 16° K, hydrogen may also be usedas a coolant in the practice of this invention.

Conductors 10 extend a length "L" over which they are to be cooled. For an accelerator magnet, it is desirable to segment the conductors 10 so that each length L of conductors 10 is cooled by an individual cooling module 15 which may, for example, be 120 meters in length or more.

In particular, each cooling module 15 includes an inner conduit 20 within the interior 21 of which is beam tube 12 and conductors 10. The inner conduit 20 should be of a material capable of containing cryogenic coolant and having sufficient heat transfer qualities for the practice of this invention. Materials such as stainless steel, beryllium-bronze, or beryllium-copper are suitable. For an accelerator, such material should also be nonmagnetic. Stainless steel 30 mils thick was found to be satisfactory for an accelerator. Inner conduit 20 is contained within an outer conduit 22. A separation is maintained between inner conduit 20 and outer conduit 22 by structural means such as stainless steel buttons 24. The separation forms a generally annular space 26 surrounding inner conduit 20. The module is provided with caps 27 and 28 for sealing the ends of the conduits. All materials may be of well-known cryogenic containment materials such as stainless steel.

A reservoir 29 of liquid coolant is contained within a refrigerator 30. Refrigerator 30 is a device for cooling the reservoir of liquid coolant such as helium or hydrogen to cryogenic temperatures at a vapor pressure of 1 atm. and serves as a reservoir for the circulating coolant. For the niobium-titanium range of about 3.6° to 4.8° K, the reservoir of refrigerator 30 would contain cooling liquid helium, for example, at 3.5° to 4.5°K. Liquid coolant is pumped and compressed by pump 32 and thereby delivered to interior 21 via pipe 33 at inlet 34 of inner conduit 20. The pump 32 performs two functions. First, it provides a pressure gradient for the circulation of the coolant and it compresses the coolant so it becomes supercooled. Supercooled coolant is a liquid having a temperature lower than the equivalent temperature of the liquid at a vapor pressure of 1 atm. and is of only one physical state. This is desirable for the practice of this invention to avoid vaporization of the supercooled liquid coolant circulating in inner 20. Within interior 21, the coolant flows through conduit 20 in the direction of arrows 35, around and in physical contact with conductors 10 over the length L of conductors 10. After traversing the length of inner conduit 20 still in the supercooled liquid state, the liquid coolant exits via outlet 36. Through pipe 38 the liquid coolant is transported to a device such as valve 40 which will allow controlled expansion of the liquid coolant so that it becomes a boiling liquid. A Joule Thompson valve or an expansion orifice may be used for valve 40. Via pipe 41, the boiling liquid coolant is fed to the annular space 26 at inlet 42, flowing in the direction of arrows 43. After traveling the length of annular space 26, it exits via outlet 45 and is transported via pipe 47 back to the reservoir of refrigerator 30 where it is recooled.

A superconducting conductor generates heat generally due to eddy current heating, particularly if pulsing is used as would be the case in an accelerator. In order to maintain the temperature of the conductor 10 at a constant superconducting level, heat transfer must occur from the conductors 10 to the supercooled liquid coolant in interior 21, and then from the supercooled liquid coolant to the boiling liquid coolant in annular space 26. Specifically, as soon as heat is added to the liquid coolant from conductors 10, the density of the coolant adjacent the conductors 10 decreases. on the other hand, liquid coolant located at a displaced position from conductors 10, particularly that adjacent inner conduit 20, is cooled by the boiling liquid helium in annular space 26. This cooled coolant increases in density. The difference in density between the two regions of the liquid coolant sets up convection currents and the liquid coolant within interior 21 begins to circulate, as illustrated by arrows 50 in FIG. 2. Thus, the heat developed by conductors 10 is continually circulated towards the inner wall of inner conduit 20 where it is transferred to the boiling liquid coolant in annular space 21. Because the heat transferred from conductors 10 is transferred by convection to the outer wall, the heat transfer is relatively independent of the length of conductors 10. In order for the convection currents to sufficiently remove heat independent of conductor length, the conductor must be sufficiently far from the wall to allow the convection currents to develop. It has been observed that for the niobium-titanium conductors cooled by helium operating in a temperature range of approximately 3.6° to 4.8° K, a separation "S" of the conductors 10 from the inner wall of inner conduit 20 of at least 10 to 50 mils will provide the necessary convection current. Best results were obtained with a separation of about 30 mils. Of course, the existence of the convection current is determined by the desired temperature range of the conductor, the heat transfer properties of the coolant, the heat generated by the conductor and the flow rates of the coolants. For each individual case, there will be a different range of separation distances in order for convection current to develop. The calculation of these dimensions is well known according to heat transfer laws.

The liquid coolant within interior 21 is cooled by the boiling coolant flowing in annular space 26 surrounding interior conduit 20. Even though the interior conduit 20 may be of stainless steel, surface area available for heat transfer between the liquid coolant and the boiling liquid coolant is so large it is possible to maintain a constant temperature within interior 21 independent of length of conductors 10 and independent of the distance from the refrigerator. Heat arriving from the warm outside environment also vaporizes part of the low-pressure boiling liquid helium. Thus, the boiling liquid helium serves as a shield against the outside environment, as well as the means for removing the heat generated by the conductor. Thus, the heat flowing in from the warm environment never enters the supercritical helium system surrounding the conductors 10. Note that the top 51 of inner conduit 20 may be cut off to allow space for vaporized coolant to collect.

Figure 3:
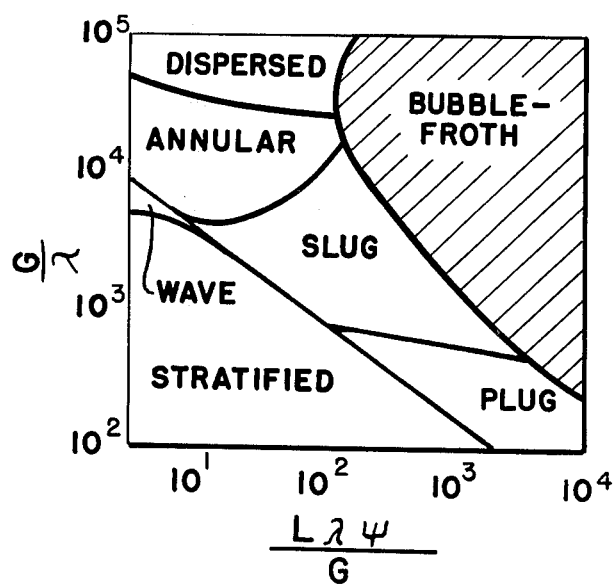
FIG. 3 is a set of curves showing flow rates for boiling liquid helium coolant.

The effect of the transfer of heat from the interior 21 to the boiling liquid coolant is to vaporize a portion of the boiling liquid coolant. The amount of this vaporization determines the minimum flow rate for the boiling liquid coolant. If the boiling liquid coolant becomes too vaporized, it will not be able to effectively remove heat. FIG. 3 illustrates by a plot the various types of flow possible for helium coolant as a function of the two parameters, fraction of liquid and gas and the dimensions of the conduit. In FIG. 3, G is the gas only mass flow rate, L is liquid only mass flow rate and $\lambda$ and $\psi$ are constants determined by the properties of the fluid. For good heat transfer, it is best if the type of flow in annular space 26, for helium, be bubble - froth.

After the minimum flow rate required for satisfactory heat transfer has been determined, pressure drop in the flow system may be determined. Note, it is possible to reduce the temperature in the conductors 10 by reducing the pressure of the boiling liquid coolant which increases the flow rate. For example, maintaining a pressure of 0.5 atmosphere in a boiling helium coolant system, a boiling temperature of 3.55° K is realized, while with a pressure of 0.56 atmosphere a temperature of about 3.58° K is realized.

Representative temperatures and flow rates, easily calculated by well-known methods, indicate the capabilities of the cooling system disclosed. For example, for a niobium-titanium conductor to be maintained at about 3.7° to 3.8° K, supercooled helium in interior 21 may be maintained at 0.1° to 0.2° K below the conductor temperature with a pressure of about 1.65 psig, and boiling liquid helium in annular space 26 may be as little as 0.025° K below the supercooled liquid helium temperature with a pressure of 0.7 and the total flow rate of the liquid helidum may be 115 lb/hr. The relatively low temperature differentials are due to the large are for heat transfer between the supercooled and boiling coolant which makes it possible to maintain a constant temperature in the interior 21 independent of distance from refrigerator 30, and to the ability of the boiling liquid coolant to prevent heat flowing in from the warm outside environment from entering interior 21.

Referring to FIG. 1 and FIG. 2, there is shown a means for further improving the cooling ability of the disclosed device. This is accomplished by the addition of a thermal shield 52 which surrounds the outer conduit 22. The thermal shield is maintained at about 15° to 20°K for an accelerator. The shield may consist of superinsulation from which heat is removed by a coolant such as helium gas at approximately 20 atmospheres flowing from the refrigerator through tubes 55 and 56. The helium gas may be returned through the other two tubes 57 and 58 to the reservoir of refrigerator 30. The tubes are thermally fastened to the shield. The helium of the cooled shield removes the bulk of the heat entering from the warm outside environment. This reduces the required flow rate of the boiling helium and improves the thermal effiency of the cryogenic system markedly.

It is important to recognize that, for a given type of conductor, once it has been determined that convection currents are to be developed in inner conduit 20, the flow rates of the liquid and boiling liquids, the separation S of the conductor from the inner wall of inner conduit 20, and the type of flow of the boiling liquid are calculable by well-known methods. This allows the adoption of the principles of this disclosure for a wide variety of conductors and configurations to be cooled to the superconducting state.

The embodiments of the invention in which an exclusive property or privilege is claimed are defined as follows:

1. A conductor and a device for cooling the conductor to the superconducting state, comprising:

a supply of liquid coolant in the supercooled state, an inner conduit being coupled to said supply of liquid coolant and having within the interior thereof the conductor and said liquid coolant in contact with said conductor or the entire length thereof so that said conductor is in the superconducting state, a supply of boiling liquid coolant at lower temperature than said liquid coolant, an outer conduit being positioned about and separated from said inner conduit to form a channel between the outer wall of said inner conduit and the inner wall of said outer conduit, and means coupled to said channel and said supply of boiling liquid coolant for pumping said boiling liquid coolant through said channel, the conductor being so separated from the inner wall of said inner conduit that with heat being generated by the conductor at the superconducting state said heat is by convention within said supercooled liquid coolant carried from the conductor to the inner wall of said inner conduit and the flow rate of said boiling liquid coolant through said channel is of such value that sufficient liquid phase remains in said boiling liquid coolant over the length of said conductor to maintain the temperature of the supercooled liquid coolant at a relatively constant value over the length of the conductor.

2. The device of claim 1 wherein said inner conduit and said channel each have first and second ends, wherein said supply of liquid coolant includes a refrigerator having a reservoir of coolant and being capable of maintaining the coolant in said reservoir at a cryogenic temperature, wherein said means for pumping includes a pump coupled to said reservoir and said first end of said inner conduit for pumping liquid coolant through said inner conduit and for compressing said liquid coolant to a supercooled liquid, and further wherein said supply of boiling liquid coolant includes valve means coupled to the second ends of said inner conduit and said channel for allowing controlled expansion of said liquid coolant thereby converting supercooled liquid coolant exiting said inner conduit to boiling liquid coolant at lower temperature than said supercoooled liquid coolant, said boiling liquid coolent so developed by said valve means passing through said channel from said second end to said first end, said first end of said channel being coupled to said refrigerator so that boiling liquid coolant exiting said channel passes to said reservoir.

3. The device of claim 2 wherein said valve means includes a Joule-Thompson valve through which said supercooled liquid coolant passes an is thereby converted to a boiling liquid at lower temperature than said supercooled liquid coolant.

4. The device of claim 3 wherein said first and second ends of said channel are coterminous with said first and second ends of said inner conduit respectively.

5. The device of claim 1 wherein said coolant is one chosen from the group consisting of helium and hydrogen.

6. The device of claim 5 wherein said conductor is to be cooled to a temperature of at least 16° K and said coolant is helium.

7. The device of claim 6 wherein the flow of the boiling coolant in said channel is bubble - froth.

8. The device of claim 7 wherein said conductor is of niobium-titanium and is to be cooled to a temperature of at least 4° K and the separation between said conductor and said inner wall of said inner conduit is between 10 and 50 mils.

9. The device of claim 8 wherein said separation is 30 mils.

10. The device of claim 1 further including a thermal shield positioned about said outer conduit.

* * * * *

UNITED STATES PATENT OFFICE
CERTIFICATE OF CORRECTION

Patent No. 4,048,437  Dated September 13, 1977

Inventor(s) Peter C. Vander Arend and William B. Fowler

It is certified that error appears in the above-identified patent and that said Letters Patent are hereby corrected as shown below:

Column 1, line 10, delete "division".

Column 3, lines 5-6, change "cooling" to --boiling--.

Column 3, line 17, after "inner" insert --conduit--.

Column 4, line 60, change ".7" to --7 psia--.

Column 4, line 62, change "are" to --area--.

Column 5, line 16, change "effiency" to --efficiency--.

Signed and Sealed this

Sixth Day of June 1978

[SEAL]

Attest:

RUTH C. MASON
Attesting Officer

DONALD W. BANNER
Commissioner of Patents and Trademarks